Aug. 6, 1957
J. O. YORK
2,801,731
CHAIN TENSIONER FOR CARGO CONVEYORS
Filed July 2, 1954
2 Sheets-Sheet 1
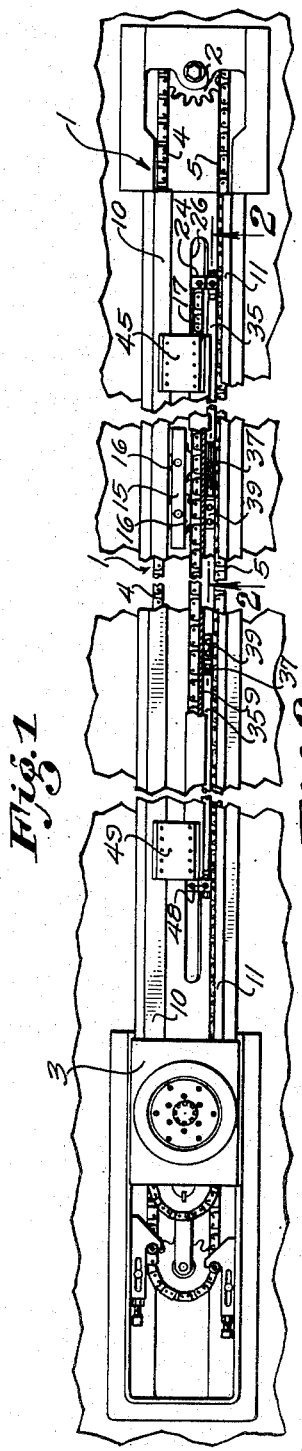
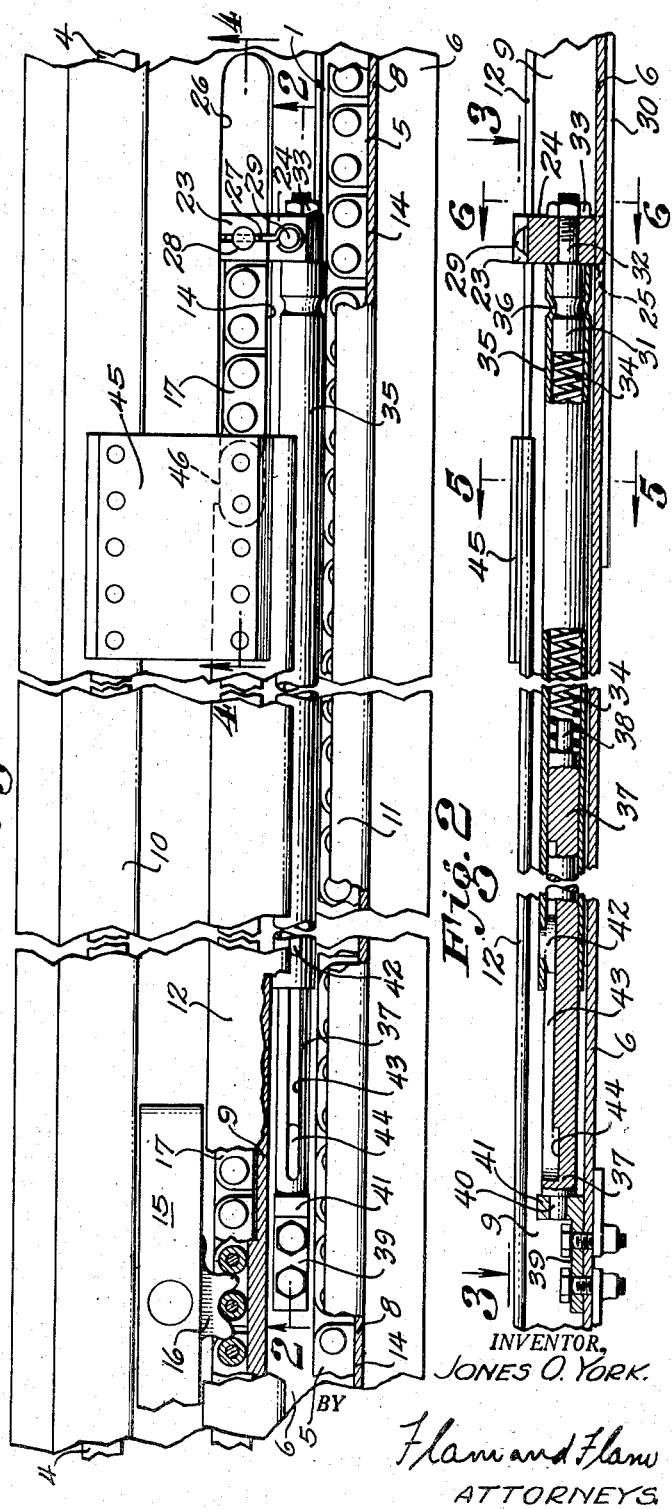
INVENTOR,
JONES O. YORK.
BY Flam and Flam
ATTORNEYS.

Aug. 6, 1957  J. O. YORK  2,801,731
CHAIN TENSIONER FOR CARGO CONVEYORS
Filed July 2, 1954  2 Sheets-Sheet 2
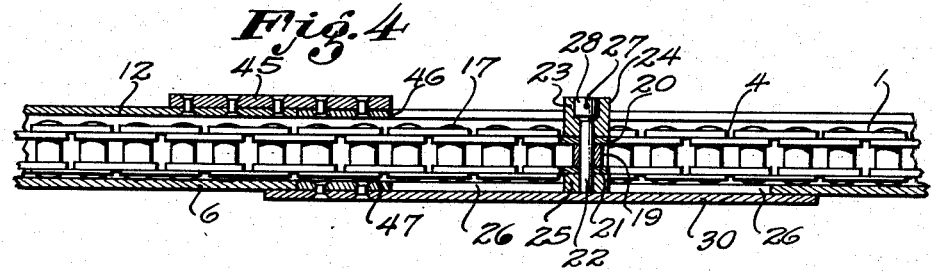
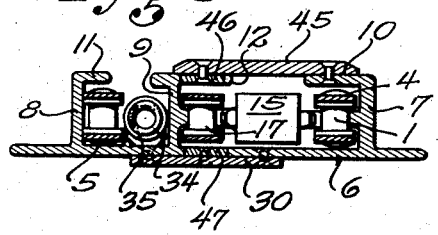 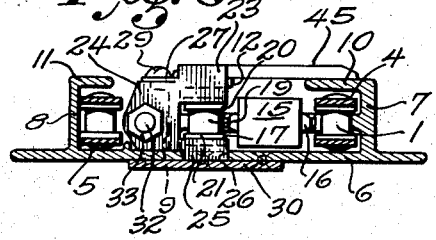
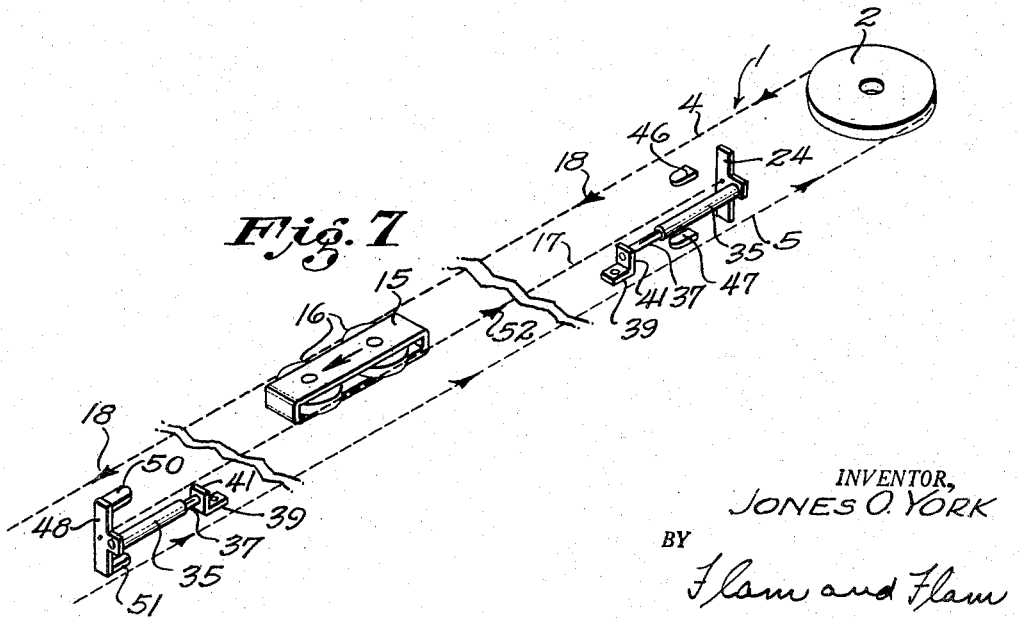
INVENTOR,
JONES O. YORK
BY
Flam and Flam
ATTORNEYS

United States Patent Office 2,801,731
Patented Aug. 6, 1957

2,801,731

CHAIN TENSIONER FOR CARGO CONVEYORS

Jones O. York, Burbank, Calif., assignor to Coast Pro-Seal & Mfg. Co., Burbank, Calif., a corporation of California Application July 2, 1954, Serial No. 441,003

9 Claims. (Cl. 198—208)

This invention relates to cargo conveyors, of the type described and claimed in a prior application, filed in the name of Jones O. York, on July 27, 1953, under Serial No. 370,481, and entitled Tensioning Device for Sprocket Chain Conveyors. This application is a continuation in part of said application.

In such devices, a sprocket chain or other flexible element passes around appropriate sprocket wheels. A motor operates to move the chain. One of the reaches of the chain engages one or more sprocket wheels carried by a "mouse." These wheels mounted on the mouse are also in engagement with a supplemental chain, separate from the conveyor chain. Accordingly, movement of that conveyor chain reach that is in engagement with the mouse serves to move the mouse in the same direction, but to an extent corresponding to half the movement of the conveyor chain. Since the conveyor chain as well as the supplemental chain are quite long (of the order of sixty-five feet), tensioning of these chains under load causes a slackness in that part of the chain which is not tensioned by the mouse. Such slack in either of the chains may cause kinking or displacement of the chain with respect to the engaged sprocket wheels.

In said prior application, provisions for taking up the slack of the conveyor chain are described and claimed. It is one of the objects of this invention to provide a simple and effective device for tensioning the supplemental chain or flexible element.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a plan view of a conveyor mechanism incorporating the invention, the length of the conveyor chains being greatly shortened in order to reduce the size of the figure;

Fig. 2 is an enlarged fragmentary sectional view, taken along a plane corresponding to line 2—2 of Fig. 1, the parts being broken away for reducing the size of the figure;

Fig. 3 is a plan view of that portion of the apparatus shown in Fig. 2 and taken from a plane corresponding to the line 3—3 of Fig. 2;

Fig. 4 is a sectional view taken along a plane corresponding to line 4—4 of Fig. 3;

Figs. 5 and 6 are sectional views taken along planes respectively corresponding to lines 5—5 and 6—6 of Fig. 2; and Fig. 7 is a diagrammatic pictorial view illustrating the mode of operation of the apparatus.

As described in said prior application a long sprocket chain 1 is provided, looped over idler sprocket wheel 2, as well as around another sprocket wheel (not shown), mounted beneath the support or carriage 3. This sprocket chain is shown greatly shortened. The distance between the two sprocket wheels is of the order of seventy (70) feet or more.

Reaches 4 and 5 of the sprocket chain 1 are appropriately supported by frame elements as described in the said prior application. The important element of the frame is a base member 6, having integrally formed upright walls 7 and 8 (see Figs. 5 and 6). An intermediate upright wall 9 is also provided. The walls 7 and 8 have inwardly directed flanges 10 and 11, and the intermediate wall 9 has a flange 12.

The flange 12 extends on either side of the wall 9. The flange 10 and wall 7 form a space for the reach 4 (Figs. 5 and 6); similarly, the flange 11 and the wall 8 form a space for the reach 5. The links 14 of the chain links are shown as flattened, and these flat sides are directed toward respective walls 7 and 8. In this way, the links are properly guided and restrained against material angular movement during their straight line travel.

A mouse structure 15 shown in Figs. 1 and 3 has a pair of sprocket wheels 16 engaging the reach 4. This mouse structure is identical with that described in the said prior application, and further description thereof is unnecessary. It serves to move a load by appropriate mechanism carried by the mouse.

In order to cause the mouse 15 to move longitudinally with respect to the structure 6, the sprocket wheels 16 also engage a supplemental sprocket chain structure 17. This sprocket chain structure, as hereinafter described, is supported between the member 6 and the flange 12. Now assuming that the reach 4 of the conveyor chain 1 is moved in the direction of the arrows 18, as shown in Fig. 7, the mouse 15 will also be moved in the same direction; and the supplemental chain 17 serves as a reaction member for the wheels 16. The supplemental chain 17 has a length comparable with the length of the reaches 4 and 5, as indicated in Fig. 7. The opposite ends of the chain 17 are resiliently urged apart by the spring structure now to be described, so as to keep this chain under tension.

At the right-hand end of chain 17 there are roller 19 and upper and lower links 20 and 21 (Fig. 4). A pin 22 extends through the roller 19 and the links 20 and 21. Its upper portion passes through the projection 23 formed integrally with a block 24 (see, also, Figs. 2 and 3). This block 24 is provided with a lower projection 25 (Fig. 6) through which the pin 22 passes. This lower projection 25 is guided in a slot 26 formed in the member 6.

The pin 22 is held in place against removal by a cross wire 27 passing through the head 28 of the pin and held in place by a screw 29, attached to the top of the block 24. In this way the pin 22 can be removed only when the screw 29 is removed. A cover plate 30 is disposed below the slot 26, as indicated most clearly in Fig. 6, so as to form a surface or rest upon which the block 24 may be guided.

The block 24 is resiliently urged toward the right, as viewed in Figs. 1, 2, 3 and 4, and accordingly, the chain 17 is placed under tension. Thus, firmly attached to the block 24, is a generally cylindrical member 31 (Fig. 2). The axis of this member is parallel to the chain 17 and spaced between the chain 17 and the reach 5. It is attached to the block 24 by the aid of a threaded extension 32, which is engaged by a nut 33. The left-hand surface of this member 31 is engaged by a compression spring 34, encased in a tubular housing 35 (see, also, Fig. 5).

This tubular housing may be firmly attached to the abutment member 31 as by crimping it into an annular groove 36 formed in the outer surface of the member 31.

The left-hand end of the spring 34, shown most clearly in Fig. 2, abuts the end of a stationary rod 37, and is provided with a guiding extension 38. This guiding extension 38 projects into the left-hand end of the spring 34. The rod 37 slidingly telescopes within the tube 35.

The left-hand end of the rod 37 is firmly attached to a bracket 39, fixed to the base 6. This may be accomplished by the aid of a projection 40 firmly held in the upright portion 41 of bracket 39.

The tubular housing 35 is prevented from being moved off the rod 37. For this purpose, it is keyed to the rod 38 as by the aid of a key 42. The expansion of the spring 34 is also limited by engagement of key 42, with the end of keyway 43. The key 42 may be removed and replaced by moving the housing 35 to its extreme left-hand position against the upright portion 41, and compressing spring 34. The key 42 then drops into a deeper part 44 of the keyway 43 and the housing 35 is released.

Limits are imposed upon the movement of the block 24 in a direction toward the left, as viewed in Fig. 2. For this purpose, a plate 45 is attached to the flanges 10 and 12 (see, also, Figs. 5 and 6). A stop 46 is attached as by welding, underneath the plate 45 in a cutaway portion of the flange 12. A similar stop 47 is attached, as by welding, to the cover plate 30 (Figs. 4 and 5). These stops, together with the right-hand edge of the plate 45, serve as a stop for the block 24.

A similar spring structure attached to the left-hand end of the chain 17 is provided and is indicated in Fig. 1. A block 48 corresponding to block 24 is indicated in contact with the plate 49 corresponding to plate 45. However, in this instance, the spring arrangement is such as indicated in Fig. 7 to exert a pull on the chain 17 in a direction to the left. Stops 50 and 51 corresponding to stops 46 and 47 are also similarly arranged, as indicated in Fig. 7.

In order to explain the mode of operation, reference may be made to Fig. 7. When the mouse 15 is moving toward the left, a tension is imposed upon the chain 17 in the direction indicated by the arrow 52. Accordingly, the compression spring located at the left-hand end is compressed by the movement of the block 48 toward the right. However, spring 34 at the right-hand end of the chain 17 is allowed to expand and to move the block 24 to take up the slack existing in the chain 17 between the mouse 15 and the block 24. Upon reverse travel of the mouse 15, the spring would be compressed at the right-hand end of the chain 17 and allowed to expand at the left-hand end of the chain.

There is sufficient freedom of movement for the blocks 24 and 48 to correspond to the requirements for keeping the chain 17 in tension in spite of the maximum tensioning force applied to the chain 17.

The inventor claims:

1. In a device of the character described: a flexible loop member; means for moving the member; a load moving member in force transmitting relation to the loop member; a supplemental flexible member also in force transmitting relation to the load moving member; springs connected respectively to each end of the supplemental member to urge said ends apart; and housings for the springs.

2. In a device of the character described: a flexible loop member; means for moving the member; a load moving member in force transmitting relation to the loop member; a supplemental flexible member also in force transmitting relation to the load moving member; a pair of compression springs respectively connected to each end of the supplemental member to urge said ends apart; means providing a stationary abutment for each of the springs; and housings for the springs.

3. In a device of the character described: a flexible loop member; means for moving the member; a load moving member in force transmitting relation to the loop member; a supplemental flexible member also in force transmitting relation to the load moving member; springs connected respectively to each end of the supplemental member to urge said ends apart; housings for the springs; and means associated with each end of the supplemental flexible member for limiting longitudinal movement of the respective end in a direction toward the other end.

4. In a device of the character described: a flexible loop member; means for moving the member; a load moving member in force transmitting relation to the loop member; a supplemental flexible member also in force transmitting relation to the load moving member; a pair of compression springs respectively connected to each end of the supplemental member to urge said ends apart; means providing a stationary abutment for each of the springs; housings for the springs; and means associated with each end of the supplemental flexible member for limiting longitudinal movement of the respective end in a direction toward the other end.

5. In a sprocket chain conveyor having a movable sprocket chain, a load moving member that carries one or more sprocket wheels in engagement with the chain, and a supplemental chain parallel to the conveyor chain and also in engagement with the sprocket wheel or wheels of the load moving member, the combination therewith of: a pair of springs connected respectively to the opposite ends of the supplemental chain and exerting forces tensioning said supplemental chain; and stops for limiting the movement of the said ends in directions respectively opposed to the force of the springs.

6. In a sprocket chain conveyor having a movable sprocket chain, a load moving member that carries one or more sprocket wheels in engagement with the chain, and a supplemental chain parallel to the conveyor chain and also in engagement with the sprocket wheel or wheels of the load moving member, the combination therewith of: a pair of compression springs respectively associated with the ends of the supplemental chain and urging said ends apart; and means limiting movement of said ends in directions respectively opposed to the force of the springs.

7. In a sprocket chain conveyor having a movable sprocket chain, a load moving member that carries one or more sprocket wheels in engagement with the chain, and a supplemental chain parallel to the conveyor chain and also in engagement with the sprocket wheel or wheels of the load moving member, the combination therewith of: a pair of compression springs respectively associated with the ends of the supplemental chain and urging said ends apart; means limiting movement of said ends in directions respectively opposed to the force of the springs; and tubular housings for the springs.

8. In a device of the character described: a flexible loop member; wheels around which the loop member extends; means for moving the loop member around said wheels; a load moving member having wheels cooperating with a reach of the loop member; a linearly arranged supplemental flexible member cooperating with the wheels of the load moving member; said supplemental member having an effective length paralleling said reach; and a pair of resilient means, respectively at each end of said effective length, for tensioning said supplemental member.

9. In a device of the character described: a flexible loop member; wheels around which the loop member extends; means for moving the loop member around said wheels; a load moving member having wheels cooperating with a reach of the loop member; a linearly arranged supplemental flexible member cooperating with the wheels of the load moving member; said supplemental member having an effective length paralleling said reach; and a pair of resilient means, respectively at each end of said effective length, for tensioning said supplemental member, each tensioning means comprising a compression spring, and a stationary abutment for one end of the spring, the other end of the spring being connected to the supplemental member.

References Cited in the file of this patent

UNITED STATES PATENTS

| | | |
|---|---|---|
| 1,634,187 | Hartvikson | June 28, 1927 |
| 1,726,604 | Amen | Sept. 3, 1929 |
| 2,685,377 | Auger | Aug. 3, 1954 |